United States Patent
Ranasinghe et al.

(10) Patent No.: US 6,405,521 B1
(45) Date of Patent: Jun. 18, 2002

(54) GAS TURBINE POWER AUGMENTATION INJECTION SYSTEM AND RELATED METHOD

(75) Inventors: Jatila Ranasinghe, Niskayuna; Walter Phillip Jones, Schenectady, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,700

(22) Filed: May 23, 2001

(51) Int. Cl.$^7$ ................................................ F02G 3/00
(52) U.S. Cl. .................... 60/39.05; 60/39.06; 60/39.182
(58) Field of Search ........................ 60/39.05, 39.06, 60/39.182, 39.2, 39.3

(56) References Cited

U.S. PATENT DOCUMENTS

| | | |
|---|---|---|
| 2,678,531 A | 5/1954 | Miller |
| 2,863,282 A | 12/1958 | Torell |
| 3,693,347 A * | 9/1972 | Kydd et al. ................. 60/39.05 |
| 3,747,336 A | 7/1973 | Dibelius et al. |
| 3,785,146 A | 1/1974 | Bailey et al. |
| 4,259,837 A | 4/1981 | Russell et al. |
| 4,393,649 A | 7/1983 | Cheng |
| 4,466,241 A * | 8/1984 | Inui et al. ................. 60/39.182 |
| 4,507,914 A * | 4/1985 | Rice ........................... 60/39.17 |
| 4,519,207 A * | 5/1985 | Okabe et al. ............. 60/39.182 |
| 4,785,622 A | 11/1988 | Plumley et al. |
| 4,928,478 A * | 5/1990 | Maslak ....................... 60/39.05 |
| 5,566,542 A | 10/1996 | Chen et al. |
| 5,622,044 A | 4/1997 | Bronicki et al. |
| 6,003,298 A | 12/1999 | Horner |

* cited by examiner

Primary Examiner—Hoang Nguyen
(74) Attorney, Agent, or Firm—Nixon & Vanderhye P.C.

(57) ABSTRACT

A method of augmenting power in a gas turbine plant that includes a compressor, at least one combustor, a turbine component and an output shaft, comprising a) supplying air and water to a heat recovery boiler; b) providing a turbine controller that controls supply of air, steam or a mixture of air and steam to the combustor; c) storing data in the turbine controller including properties of air, steam and equations for determining properties of any mixture of air and steam; d) measuring a differential pressure of the air, steam or mixture of air and steam across a metering tube located upstream of the combustor; e) determining instantaneously the mass flow rate of the air, steam or mixture of air and steam as a function of said differential pressure and desired power output; and f) supplying the air, steam or mixture of air and steam to the combustor at the flow rate determined in step e); wherein step f) is carried out with a control valve downstream of the metering tube, the control valve operatively connected to the turbine controller.

10 Claims, 1 Drawing Sheet

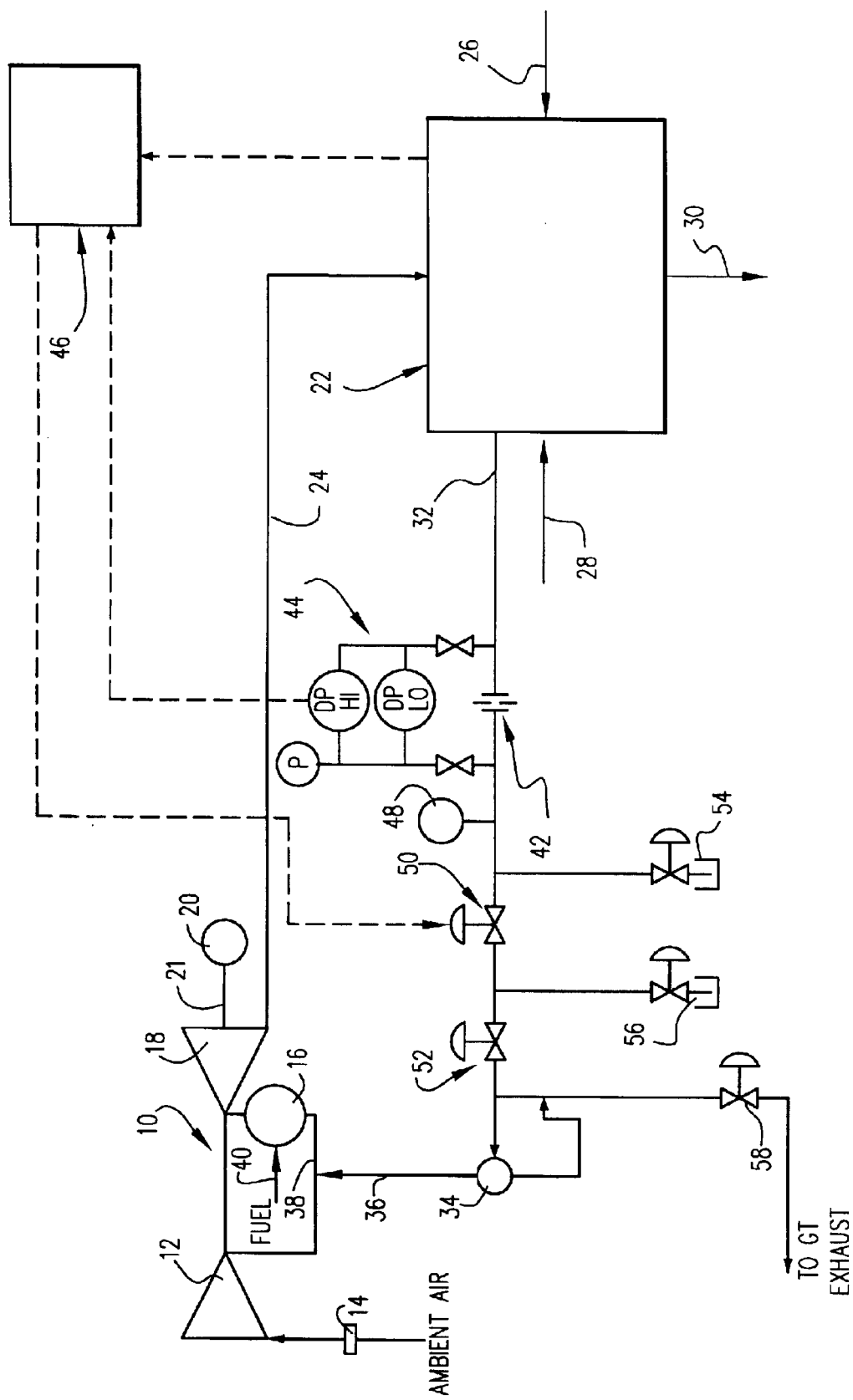

GAS TURBINE POWER AUGMENTATION INJECTION SYSTEM AND RELATED METHOD

BACKGROUND OF THE INVENTION

The present invention relates to land based gas turbines employing gas injection for power augmentation. Specifically, a method of designing a gas metering system is provided that allows the power augmentation system to be used with more than one diluent gas or a mixture of gasses.

Diluent injection (typically steam) into the combustors of a gas turbine can increase the unit peak load capability, particularly at high ambient temperature conditions. When a fluid other than the one that the typical system was designed for is used, however, the calculated diluent or fluid flow will be incorrect, because of fluid property differences (particularly density and viscosity) in the respective fluids. To correctly control the flow of different fluids or fluid mixtures, air and steam for example, a scheme that properly accounts for fluid property differences is required.

The conventional diluent injection method is to use a single set of fluid properties in the metering logic to calculate diluent mass flow. The calculated flow is based on the measured flow element differential pressure. If, for example, a system of this type is set up for steam injection, it can only calculate steam flow. It cannot set the proper mass flow for air injection or an air/steam mixture injection. The control logic must have the proper fluid properties reentered whenever the diluent changes.

SUMMARY OF INVENTION

This invention provides a method that can properly meter multiple or mixtures of diluent fluids for gas turbine combustor injection for power augmentation, without requiring reentry of fluid properties when the diluent fluid is changed, and without the use of separate flow measurement devices for each diluent.

In the exemplary embodiment of the invention, the gas turbine controller logic includes multiple fluid property sets for air and steam, along with the equations necessary to compute the properties of any mixture of air and steam. Input includes signals from the steam and air injection system to the gas turbine controller logic for fluid type and mass fraction for each diluent fluid in service. The gas turbine control logic will calculate the correct fluid properties to be used in the diluent flow rate calculation. With this arrangement, a single metering tube, control valve and differential pressure instrument set can provide the required information for proper determination and control of the diluent mass flow rate, whether the diluent be air, steam or a mixture of air and steam.

Accordingly, in its broader aspects, the present invention relates to a method of augmenting power in a gas turbine plant that includes a compressor, at least one combustor, a turbine component and an output shaft, comprising a) supplying air and water to a heat recovery boiler; b) providing a turbine controller that controls supply of air, steam or a mixture of air and steam to the combustor; c) storing data in the turbine controller including properties of air, steam and equations for determining properties of any mixture of air and steam; d) measuring a differential pressure of the air, steam or mixture of air and steam across a metering tube located upstream of the combustor; e) determining substantially instantaneously the mass flow rate of the air, steam or mixture of air and steam as a function of the differential pressure and desired power output; and f) supplying the air, steam or mixture of air and steam to the combustor at the flow rate determined in step e).

In another aspect, the invention relates to a method of augmenting power in a gas turbine plant that includes a compressor, at least one combustor, a turbine component and an output shaft, comprising a) supplying air and water to a heat recovery boiler for heat exchange with exhaust gas from the turbine component; b) providing a turbine controller that controls supply of air, steam or a mixture of air and steam to the combustor; c) storing data in the turbine controller including viscosity and density of air, steam and equations for determining properties of any mixture of air and steam; d) measuring a differential pressure of the air, steam or mixture of air and steam across a metering tube located upstream of the combustor; e) determining instantaneously the mass flow rate of the air, steam or mixture of air and steam as a function of the differential pressure and desired power output; and f) supplying the air, steam or mixture of air and steam to the combustor at the flow rate determined in step e); wherein step f) is carried out with a control valve downstream of the metering tube, the control valve operatively connected to the turbine controller.

In still another aspect, the invention relates to a land based gas turbine plant comprising a compressor, a turbine component, and a combustor between the compressor and the turbine component; a heat recovery boiler arranged to receive exhaust gas from the turbine component; means for injecting air, steam, or a mixture of air and steam into the combustor; and means for substantially instantaneously calculating mass flow rate of the air, steam or mixture of air and steam.

BRIEF DESCRIPTION OF DRAWINGS

The single FIGURE is a schematic diagram of a flow metering gas injection system in accordance with the invention.

DETAILED DESCRIPTION

With reference to the FIGURE, a simple cycle gas turbine plant 10 includes a compressor 12 supplied with ambient air at an inlet 14; an annular array of combustors 16 (only one indicated); and a turbine component 18 that drives a generator 20 or other machine via rotor or shaft 21. The exhaust from the turbine component 18 is supplied to the steam and air injection supply system (SAIS) or heat recovery boiler 22 via stream 24. In this exemplary embodiment, demineralized water and ambient air are supplied to the SAIS via input streams 26, 28, respectively. The water and air are heated via heat exchange with the turbine exhaust gas which is subsequently exhausted to atmosphere via stream 30. Heated air, steam (generated in the boiler 22), or a mixture of air and steam are supplied via stream 32 to an on-base manifold 34 for distribution to the annular array of combustors 16 via streams 36, 38 after mixing with air from the compressor 12. Fuel is supplied to the combustor 16 via stream 40.

The diluent or fluid supplied from the SAIS 22 passes through a metering tube 42 and a differential pressure (high and low) measurement device 44 measures the pressure drop across the metering tube, and this data is supplied to the gas turbine controller 46 for purposes of calculating the required mass flow of the air, steam, or mixture of the two.

The temperature of the diluent is measured at 48 and a control valve 50 controls the flow of diluent to the manifold 34. A stop or isolation valve 52 is located downstream of the control valve for complete shut-off when necessary or desired. Drain valves 54, 56 and 58 are used to remove condensate from the conduits and from the manifold 34, and to pre-heat the system.

Before the steam-air mixture is actually admitted to the on-base manifold 34, all upstream conduits or piping must complete a preheat sequence. An improperly preheated steam-air mixture injection system can potentially deliver condensate to the combustors, which could extinguish the flame or damage hardware. To ensure adequate preheating of the steam-air mixture injection system, hot air from an off-base compressor or other suitable source may be used to preheat the system. The steam-air mixture will not be admitted to the machine until the preheat conditions are satisfied.

In accordance with this invention, the gas turbine controller 46 includes a microprocessor where data is stored relating to the individual properties of air and steam (or other gas), particularly viscosity and density, as well as the equations required to determine the combined properties of a mixture of air and steam in the event such a mixture is employed. When the differential pressure is measured at 44, a signal is sent to the controller 46 where the information is used along with the stored properties of air, steam and the equations mentioned above, to substantially instantaneously calculate the applicable mass flow rate for the air, steam, or mixture of air and steam. Appropriate signals are then returned to the control valve 50 to supply the appropriate amount of diluent to the manifold 34, based on the diluent properties as well as the desired power output of the turbine.

The software required to implement the storage and conversion function relating to mass diluent flow is within the skill of the art and need not be described in detail here.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of augmenting power in a gas turbine plant that includes a compressor, at least one combustor, a turbine component and an output shaft, comprising:
    a) supplying air and water to a heat recovery boiler;
    b) providing a turbine controller that controls supply of air, steam or a mixture of air and steam to the combustor;
    c) storing data in the turbine controller including properties of air, steam and equations for determining properties of any mixture of air and steam;
    d) measuring a differential pressure of the air, steam or mixture of air and steam across a metering tube located upstream of the combustor;
    e) determining substantially instantaneously the mass flow rate of the air, steam or mixture of air and steam as a function of said differential pressure and desired power output; and
    f) supplying the air, steam or mixture of air and steam to the combustor at the flow rate determined in step e).

2. The method of claim 1 wherein water and air are supplied to the heat recovery boiler for heat exchange with exhaust gas from the turbine component.

3. The method of claim 1 wherein said properties include density and viscosity.

4. The method of claim 1 wherein step f) is carried out with a control valve downstream of the metering tube, said control valve operatively connected to said turbine controller.

5. The method of claim 2 wherein the air is supplied at ambient temperature and the water is demineralized water.

6. A method of augmenting power in a gas turbine plant that includes a compressor, at least one combustor, a turbine component and an output shaft, comprising:
    a) supplying air and water to a heat recovery boiler for heat exchange with exhaust gas from the turbine component;
    b) providing a turbine controller that controls supply of air, steam or a mixture of air and steam to the combustor;
    c) storing data in the turbine controller including viscosity and density of air, steam and equations for determining properties of any mixture of air and steam;
    d) measuring a differential pressure of the air, steam or mixture of air and steam across a metering tube located upstream of the combustor;
    e) determining instantaneously the mass flow rate of the air, steam or mixture of air and steam as a function of said differential pressure and desired power output; and
    d) supplying the air, steam or mixture of air and steam to the combustor at the flow rate determined in step e); wherein step f) is carried out with a control valve downstream of the metering tube, said control valve operatively connected to said turbine controller.

7. The method of claim 2 wherein the air is supplied at ambient temperature and the water is demineralized water.

8. A land based gas turbine plant comprising a compressor, a turbine component, and a combustor between said compressor and said turbine component; a heat recovery boiler arranged to receive exhaust gas from the turbine component; means for injecting air, steam, or a mixture of air and steam into the combustor; a metering tube and differential pressure measurement device for obtaining differential pressure of the air, steam or mixture of air and steam across the metering tube; and means for substantially instantaneously calculating mass flow rate of the air, steam or mixture of air and steam.

9. The land based gas turbine plant of claim 8 wherein said metering tube and said pressure differential measuring device are located downstream of said heat recovery boiler and upstream of said combustor.

10. The land based gas turbine plant of claim 9 and further comprising a control valve downstream of the differential pressure measurement device.

* * * * *

UNITED STATES PATENT AND TRADEMARK OFFICE
CERTIFICATE OF CORRECTION

PATENT NO.     : 6,405,521 B1
DATED          : June 18, 2002
INVENTOR(S)    : Ranasinghe et al.

It is certified that error appears in the above-identified patent and that said Letters Patent is hereby corrected as shown below:

<u>Column 4,</u>
Line 32, delete "d)" and insert -- f) --.

Signed and Sealed this

Fourteenth Day of January, 2003

JAMES E. ROGAN
*Director of the United States Patent and Trademark Office*